United States Patent
Hartman et al.

[11] Patent Number: 5,254,352
[45] Date of Patent: Oct. 19, 1993

[54] FISH ANALOG PRODUCT

[75] Inventors: William J. Hartman, Duluth, Minn.; Robert F. Delahunt, Gordon, Wis.

[73] Assignee: Oscar Mayer Foods Corporation, Madison, Wis.

[21] Appl. No.: 988,747

[22] Filed: Dec. 10, 1992

Related U.S. Application Data

[62] Division of Ser. No. 762,868, Sep. 18, 1991, Pat. No. 5,188,854.

[51] Int. Cl.$^5$ .............................................. A23L 1/325
[52] U.S. Cl. ........................................ 426/92; 426/643
[58] Field of Search ............... 426/92, 272, 302, 643, 426/513

[56] References Cited

U.S. PATENT DOCUMENTS

| | | | |
|---|---|---|---|
| 3,863,017 | 1/1975 | Yueh | 426/376 |
| 4,287,218 | 9/1981 | Rich et al. | 426/272 |
| 4,301,182 | 11/1981 | Simon et al. | 426/250 |
| 4,362,752 | 12/1982 | Sugino et al. | 426/104 |
| 4,579,741 | 4/1986 | Hanson et al. | 426/92 |
| 4,584,204 | 4/1986 | Nishimura et al. | 426/623 |
| 4,588,601 | 5/1986 | Maruyama et al. | 426/574 |
| 4,622,234 | 11/1986 | Okada | 426/643 |
| 4,816,279 | 3/1989 | Katoh et al. | 426/513 |
| 4,888,181 | 12/1989 | Gray et al. | 426/643 |
| 4,919,959 | 4/1990 | Hosaka et al. | 426/574 |
| 4,948,620 | 8/1990 | Clairovin et al. | 426/643 |
| 4,950,494 | 8/1990 | Katoh et al. | 426/643 X |
| 5,145,701 | 9/1992 | Sugino | 426/643 X |

FOREIGN PATENT DOCUMENTS 63-196246  8/1988  Japan ................................ 426/643

Primary Examiner—Arthur L. Corbin
Attorney, Agent, or Firm—Bell, Seltzer, Park & Gibson

[57] ABSTRACT

A fish fillet or fish steak analog containing fish chunks having a gelled surimi paste between adjacent chunks and substantially covering the surfaces of the chunks.

4 Claims, 1 Drawing Sheet

FISH ANALOG PRODUCT

This application is a divisional of application Ser. No. 07/762,868, filed Sep. 18, 1991, now U.S. Pat. No. 5,188,854.

BACKGROUND OF THE INVENTION

This invention relates to food technology and, more particularly, to seafood products.

Imitation seafood products, or seafood analogs, are a fast growing segment of the food product industry. Such products result from processes wherein less expensive or underutilized fish or seafood varieties are converted into products with the form and taste of more desirable seafood varieties.

The most prevalent examples of seafood analogs are those derived from surimi. Surimi is a form of minced fish flesh which has been processed to remove water soluble proteins. The minced flesh that remains is surimi. It is comprised of water insoluble proteins, largely in the form of short muscle fibers. When the surimi is ground or minced into a finely comminuted paste in the presence of salt, the surimi turns into a sticky paste having gel-forming characteristics, as the salt aids in extracting otherwise insoluble proteins from the muscle fibers. When subsequently heated, the proteins thus extracted into the paste will denature and form a gel. The final shape of the product is thus dictated by whatever mold or form it occupies at the point when the surimi paste is solidified.

Surimi-based pastes are often used in forming seafood analogs, because of this gel-forming capacity, which also means that it can be molded or formed into virtually any desired shape. The gelling property also allows the texture to be varied somewhat, through controlling parameters involving gel strength and viscosity. Thus, the naturally occurring forms and textures of many types of seafood products can be duplicated, particularly those of shell fish. Other additives in addition to salt can be incorporated into the paste, and these often include flavorings derived from or reminiscent of the seafood variety to be duplicated.

In this manner, underutilized marine fish are processed for the taste or flavor of, and then molded into the form of, more desirable seafood varieties, with the most frequently duplicated products being relatively expensive or rare shellfish varieties such as crab, shrimp or lobster. Recent advances have involved improvements in such aspects as the formulation of the surimi paste, or in ways to affect the gel forming step to impart specific properties to the final product.

More specifically, many recent advances address the problem of providing a more natural texture to the surimi-based product, such as those disclosed in U.S. Pat. Nos. 4,301,812, 4,579,741, 4,584,204 and 4,919,959. These patents all provide processes for imparting a texture to the solidified surimi paste itself that will more closely duplicate the texture of the marine product being imitated.

Other approaches for incorporating more of a natural texture to surimi-like products are disclosed in U.S. Pat. Nos. 3,863,017, 4,362,752, 4,588,601 and 4,888,181. In these patents, processes are disclosed wherein the surimi paste is blended with other materials which provide the added texturizing material is a fibrous material, and these are added to provide the product with a texture reminiscent of natural muscle fiber. The disclosed processes result in final products approximating the textures of such seafood varieties as shrimp, prawn, crab and lobster. The texture is due to the particular kinds and amounts of fibers incorporated into the surimi paste matrix prior to solidifying, or gelling, the matrix.

Because these surimi pastes form gels upon heating, it is easy to mold the imitation product into a desired shape. Because it is a gel, the final product will naturally have a rubbery or chewy feel. This limits the usefulness of such processes for duplicating fish products and when not producing shellfish analogs. In U.S. Pat. No. 4,301,182, an elaborate process is disclosed which duplicates a fish product such as flaked tuna. Dark meat portions of whole fish are minced into a fish paste and then extruded into a hot water bath. Extrusion is through a restricted orifice approximately 1 inch wide and ⅛ to 1/16 inch thick. The product is then further processed and preferably recombined with tuna loin meat prior to packaging Although the form and texture of shell fish can be duplicated with surimi pastes, the flakiness or forkability of fish steaks or fillets cannot be achieved with existing surimi processes. Cooked fish flesh has a desirable flaky character, such that the layers of muscle are easily pulled apart. Forkability is a term which describes the manner in which pieces of the flesh of cooked fish will easily pull apart with moderate pressure applied by a fork. It has heretofore been impossible to duplicate these characteristics in imitation seafood products so that close analogs of such seafood products as fish fillets or fish steaks could be produced.

Among the objects of this invention, then, is to provide a process for producing formed fish products in a variety of heretofore unavailable forms and shapes.

A more specific object is to provide fish products which duplicate the form and feel of true fish fillets and steaks.

Another object is to provide a method for using surimi-based paste to produce analog fish products which have the form and feel of true fish fillets and steaks.

A further object is to provide a product of integrated fish flesh which holds its shape without the addition of breading or other external binders.

A still further object is to provide a method for producing imitation fish products where the texture of the final product is improved by utilizing as a starting material pieces of whole fish which have been cut or chunked and where the final fish product is fish flesh based.

Another object is to provide a fully cooked formed fish product which is available to the consumer refrigerated and in a sterile package, and which can be quickly and easily warmed for eating.

SUMMARY OF THE INVENTION

For the achievement of these and other objects, this invention provides a process for preparing seafood analogs which can be used to produce formed fish products in styles or varieties which were previously unavailable. The preferred process comprises mixing whole fish flesh pieces or chunks with a coating of a paste of a surimi-based binder, with the former being held together by the latter in the final product. The products can be further processed for flavor and appearance. Since a relatively large proportion of the analog is comprised of intact or true pieces of fish flesh, the final product duplicates the texture of fish fillets or steaks, without having any of the rubbery or chewy characteristics of other surimi-based seafood analogs.

The binder used can be a surimi paste, or any gelling substance which when solidified will set the whole, relatively intact chunks of fish flesh into the formed fish product. A surimi paste binder is preferably used in a minimal amount to coat pieces of fish flesh. The resulting mixture is formed into a shape, which is preferably analogous to that of a consumer-favored fish steak or fillet. The amount of surimi utilized is preferably only that amount which will completely coat the pieces and thus securely bind them together after the surimi has been gelled.

The fish pieces preferably remain frozen throughout the mixing and forming steps of the process. This maintains the integrity of the fish muscle tissue, as the hard frozen tissue resists shearing or deformation from the stresses of mixing and forming better than raw, room temperature tissue would. The pieces used should also be large enough to impart a natural fish texture to the final product. The fish pieces make up the substantial, or predominant portion of the product, and as they were processed and mixed in a frozen state, much of their natural form, flavor and texture is preserved in the final product.

The formed product is then put through a first cooking step to such a degree that the binder gels. The resulting seafood analog has both the look and feel of natural fish flesh, including the forkability, flakiness and eating quality of fish steaks or fillets. The amount of surimi, or gel, used is so low that the final product has none of the characteristic chewiness of typical surimi-based seafood analogs, and in fact the amount of surimi paste used is preferably so small as to be virtually undetectable by the consumer. The binder holds the pieces together and so other binders such as batter and/or breading are not necessary. Breading contributes calories and, when present, diminishes the overall appeal of such a product to health-conscious consumers.

The product can be further processed after forming, such as through seasoning, marking or further cooking the product to set the surimi gel. The product can then be packaged and pasteurized. Pasteurization is a second cooking step for the product, and it is preferred that a quick chill follow the pasteurization. Ultimately, the product is distributed and sold refrigerated as a fully cooked, formed fish product.

Other features and advantages of the invention will become apparent to those of ordinary skill in the art upon review of the following detailed description, claims, and drawings.

DESCRIPTION OF THE PREFERRED EMBODIMENT

Figure 1:
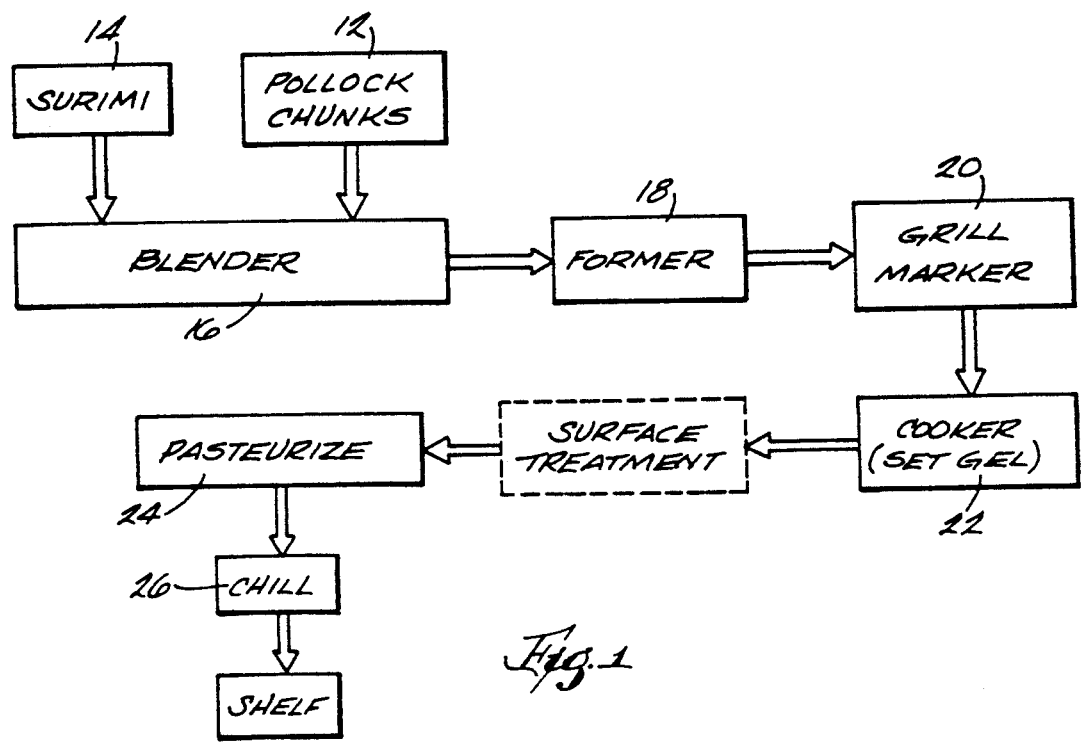
FIG. 1 is a schematic representation of the process set up and steps.
Figure 2:
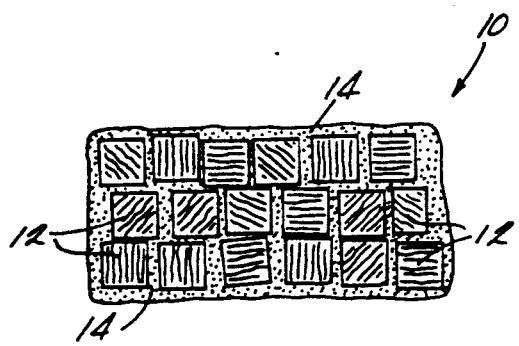
FIG. 2 is a general schematic illustration of a seafood analog produced by the process.

In accordance with the invention, a seafood analog 10, or imitation fish product, is comprised almost entirely of fish pieces 12 bound together by a small amount of a conventional surimi-based fish paste as a binder 14. The ratio of fish pieces to fish-paste binder should be very large, preferably on the order of ten to one, which provides a product with the texture, flakiness and forkability of true, or naturally occurring, fish steaks or fillets. The amount of binder used can be as little as is necessary to bind substantially all of the fish pieces together, while the fish pieces utilized should be as large as is practically possible, in order to preserve the look and feel of whole fish within the analog. The surimi-based binder can include seasonings or flavorings, and is preferably thinned with water, relative to other surimi-based pastes used to produce seafood analogs, so that the binder will thoroughly coat the fish pieces during mixing.

More particularly, in the preferred process pieces or chunks of an inexpensive fish are mixed with a surimi-based binder in a manner to thoroughly coat the pieces and subsequently bind the pieces together when set. It is desirable that a fish without a strong flavor of its own be used, so that the flavor of the final product can be controlled, such as though seasonings or other additives incorporated into the surimi paste, permitting greater flexibility in the choice of seafood variety duplicated. Alaskan pollock is a plentiful fish which is bland in flavor, as well as a fish which may be too small for producing commercially viable steaks or fillets. Pollock is also a preferred fish for the production of surimi. The preferred imitation fish product is produced from pieces of pollock mixed with a surimi-based paste as a binder. The surimi may be pollock-based as well. The process will be described in terms of that preferred embodiment, but it should be understood that other fish types could be substituted for the pollock, and that many suitable binders could be utilized, even ones that are not based on surimi.

To produce the fish pieces for the mixture, pieces are chopped from pollock or other fish type fillets arranged end to end in a frozen block. The pieces are produced by cutting crosswise against the length of the fillets in the block, in essence producing small fish steaks from the frozen block. These pieces preferably have a width of approximately ½ inch or greater. Chunks in the range of ½ to 1 inch thick have been found to work particularly well in producing imitation fish steaks or fillets having the forkability and flakiness of natural fish steaks. Smaller or narrower pieces, such as fish flakes, will not work as well, as they do not produce the desired texture in the final product. Such smaller pieces have shorter muscle fibers, and produce a final product with a mealy texture. The size of fish pieces utilized in producing the fish product may need to be adjusted, however, and the preferred dimensions would be dictated by the thickness of the formed product. The pieces should remain frozen throughout the subsequent mixing and forming steps, and preferably are not permitted to rise above 28° C. at any time during this period.

The binder is a surimi or surimi-based paste and is prepared in any conventional way except that the surimi paste preferably has a higher percentage of water than that of usual surimi pastes used in producing typical surimi-based imitation seafood products. The extra water reduces the surimi paste viscosity and ensures that it will easily coat each of the fish pieces completely. It is this surimi paste which ultimately binds the fish pieces together in the final product, and so it must be well distributed. The preferred formula uses a percentage of water that is approximately half of the weight of the minced fish surimi, in this preferred embodiment utilizing 30% water with 58% surimi. The remainder of the formula comprises salt and fillers such as starch, seasonings or flavorings. The flavorings can include flavorings of other varieties of fish or shellfish, some of which are derived directly from those other varieties.

Salt is a common ingredient to all surimi pastes, and is important in determining the gel strength. The salt pulls proteins from the muscle fibers. When the surimi is thoroughly minced with salt, a sticky paste is produced. The amount of salt used in producing the paste is conventional, preferably about 1.5 to 2.0% by weight. The percentage of surimi paste utilized in the mixture to be formed into fillets or steaks is in the range of about 10% to 20% by weight, with the remainder being fish pieces. Thus, the amount of salt in the final product can be as low as 1/10 of that of a typical surimi-based seafood analog.

The preferred weight percentages of fish pieces and surimi paste will differ with the variety of fish used. With pollock, for example, 10% surimi paste by weight is used, with the remainder being pollock pieces, i.e., 9 to 1 pollock chunks to surimi paste. With other varieties of fish the amount of surimi paste used may need to be adjusted to achieve the best results. For cod pieces a formula utilizing 20% surimi paste is preferred, i.e. 4 to 1 cod pieces to surimi paste. As little of the surimi paste should be used as possible, however, so that the surimi paste will be virtually undetectable in the final product. The greater the amount of surimi paste that is used the more likely that the finished product will have a rubbery or gelatinous texture.

The surimi paste and the fish pieces are preferably mixed in a ribbon blender 16, wherein the fish pieces are coated with the surimi paste without undue stresses being applied to the fish pieces, which stresses would otherwise be inclined to tear or shear the fish pieces. The mixing should not rupture or damage the cells of the fish pieces, leaving them relatively intact. Any conventional blending technique which does not damage the muscle fibers, or cause mashing or deformation of the fish pieces, could be utilized. Again, the temperature of the fish pieces should remain roughly 28° F. or below throughout the mixing, as above this point the fish pieces will begin to thaw and soften, which increases the likelihood of damage or deformation of the pieces from the mixing.

From the ribbon blender, the coated fish pieces are transferred by conveyor to a former 18. The former can be of any conventional type and is operative to take a measured portion of the chilled mixture and press or otherwise form it into a predetermined shape. Most such formers involve the application of pressure to the mixture, so it is important that the pieces of the fish remain frozen throughout the formation process as well, again to prevent deformation or shearing of the pieces at this step. Thus, the temperature of the mixture should not exceed 28° F. until after processing in the former is completed.

In a preferred embodiment the former is used to make a formed seafood product in the form of 1 inch thick fish steaks or a contoured fish fillet, although any form of a desired fish product could be utilized. Although the orientations of the pieces within the formed steaks or fillets are random, this does not diminish the flaky texture, the forkability or the natural appearance of the final product. Natural or true fish steaks are comprised of unaligned muscle portions which are orientated at varying angles throughout the product. Therefore, the random orientation of the fish pieces within the formed fish product does not significantly deter from the anticipated texture, as there is no expected muscle orientation for all of the muscle portions in the fish steak or fillet.

The formed product can now have additional seasoning applied to the surface, if desired, or it can be marked, such as by running the product through a grill marker 20, which gives the appearance of a grilled product. This processing can be by any conventional means. Once the product has been formed into its final shape it can be allowed to thaw, as there are no further external stresses applied to the product during any of the steps remaining in the process.

After the formed mixture has been further processed for surface variation or seasoning, it is then conveyed to an oven 22 where it is cooked to solidify, or set, the surimi-based binder throughout. The internal temperature of the product must reach approximately 140° to 160° F. in order to set the surimi binder. The formed product is cooked in a humidity-controlled oven, which can be of any conventional type. A relatively high humidity is maintained within the oven, which regulates the yield by preventing drying of the product, thus preserving a higher moisture content. The time within the oven can be adjusted in light of these desired final characteristics, in other words to accomplish the twin goals of retaining the moisture of the product and of achieving the requisite internal temperature. After processing through the humidity-controlled oven the product is fully cooked, with the thoroughly cooked fish pieces fixed within the gelled surimi paste binder. There is, therefore, no need for breading to bind the pieces together, as has been necessary in some previous fish analog products. As the product is not breaded, it need not be oiled or fried and, therefore, the final product has the desirable attribute of being relatively fat free.

Further processing of the product is possible after the humidity-controlled oven. The product can have seasonings added or can be run through a grill marker, if these have not been done previously. Thus, surface variations can be achieved either before or after the humidity-controlled oven, while seasonings can be applied to the product either by being incorporated into the surimi paste binder or by being topically applied either before or after the passage of the product through the humidity-controlled oven.

The product is next packaged and pasteurized at station 24. In the preferred method, this is done by placing the product into a plastic tray, flushing it with nitrogen and sealing it with a plastic sheet under partial vacuum. The vacuum-sealed package is then passed through a pasteurization oven. The pasteurization step is similar to the European cooking method of sous vide, where the product is fully cooked through pasteurization in a vacuum-sealed package, chilled and then marketed as a refrigerated product rather than frozen.

The preferred method includes pasteurization at 190° to 200° F. for a predetermined time. This is a second cooking step, and the internal temperature of the fish steaks reaches about 185° F. for approximately 20 minutes. The product is cooked twice, then, once while the surimi paste binder is set, and a second time during pasteurization. The product processed to this point will have an acceptable shelf life.

To further increase the shelf life of such products, this invention proposes to quickly cool the packaged product after the pasteurization step This can involve any conventional quick-chilling method, such as immediately immersing the pasteurized product in a chilled water bath 26. The faster the product goes from hot to cold, the more favorable will be the implications for shelf life. Thus pasteurization is preferably followed by a complete submersion of the packaged product in a chilled ice water bath, preferably for about 20 to 40 minutes in a bath chilled to about 32° to 38° F.

Known fish analogs utilizing a single cooking step of pasteurization after packaging have a shelf life of 20 to 25 days. The two-step cooking process described actually increases the shelf life of the product to approximately 90 days. Double cooking produces a very clean product with a shelf life which permits virtually continent-wide distribution of a refrigerated, rather than frozen, product. Also, by not subjecting the final product to freezing and defrosting cycles, both the flavor and the texture of the product are better preserved.

The described seafood analog is an entirely new concept in seafood products, giving the consumer a wider choice in seafood analog varieties. The pollock pieces that are used in forming this product make it economically attractive to produce and the small amount of binder utilized results in a product having the texture and forkability of ocean fish. Additionally, the formation process allows for numerous product styles, flavoring and packaging options.

Although one embodiment of the present invention has been illustrated and described, it will be apparent to those skilled in the art that various changes and modifications may be made therein without departing from the spirit of the invention or from the scope of the appended claims.

What is claimed is:

1. A fish fillet or fish steak analog comprising
   chunks of a natural fish arranged in the form of a natural fish product,
   a gelled surimi paste between adjacent chunks of said fish and substantially covering the surfaces of said chunks, said surimi paste binding said fish chunks into said natural fish product form,
   said surimi paste as applied to said fish chunks having a water content, by weight, which is approximately one-half that of the surimi content of said paste, and
   said fish product form being characterized in that the said fish chunks are substantially cooked through, said surimi paste is gelled, and said fish product is pasteurized.

2. The fish product of claim 1 wherein said chunks are approximately ½ to 1 inch thick.

3. The fish product of claim 2 wherein the ratio of fish chunks to surimi paste is in the range of approximately 10% to 20% binder to 80% to 90% fish chunks.

4. The fish product of claim 2 wherein the chunks of natural fish product comprise pollock.

* * * * *

UNITED STATES PATENT AND TRADEMARK OFFICE
CERTIFICATE OF CORRECTION

PATENT NO. : 5,254,352
DATED : October 19, 1993
INVENTOR(S) : Hartman, et al.

It is certified that error appears in the above-identified patent and that said Letters Patent is hereby corrected as shown below:

In column 1, line 40, "shell fish" should be -- shellfish --

In column 2, line 21, "shell fish" should be -- shellfish --

In column 3, lines 54-55, "set up" should be -- setup --

In column 4, line 17, "though" should be -- through --

In column 4, line 53, "28°C" should be -- 28°F --

Signed and Sealed this

Tenth Day of May, 1994

Attest:

BRUCE LEHMAN

Attesting Officer

Commissioner of Patents and Trademarks